United States Patent [19]

Conrad et al.

[11] 4,022,606
[45] May 10, 1977

[54] ANTIMICROBIAL USE OF ω-AMINOCARBOXYLIC ACID AMIDES

[75] Inventors: Jens Conrad, Hilden Rhld.; Harald Schnegelberger, Leichlingen Rhld.; Hans-Werner Eckert, Dusseldorf; Ferdi Saygin, Erkrath; Günter Koppensteiner, Melsungen, all of Germany

[73] Assignee: Henkel & Cie G.m.b.H., Dusseldorf-Holthausen, Germany

[22] Filed: Sept. 9, 1975

[21] Appl. No.: 611,618

Related U.S. Application Data

[62] Division of Ser. No. 515,839, Oct. 18, 1974, abandoned.

[30] Foreign Application Priority Data

Nov. 3, 1973 Germany ............... 2355026

[52] U.S. Cl. .............. 71/67; 260/561 A; 424/320
[51] Int. Cl.² ............... A01N 9/00; A01N 9/20
[58] Field of Search .......... 424/320; 71/67; 260/561 A

[56] References Cited

UNITED STATES PATENTS 2,921,085  1/1960  Schramm ............... 260/458
3,223,700  12/1965  Klauehn et al. ............... 260/239.1

FOREIGN PATENTS OR APPLICATIONS 1,240,872  5/1967  Germany

OTHER PUBLICATIONS

Kharkharov et al., vol. 68 (1968) 50892s, Chem. Abst.

Primary Examiner—Allen J. Robinson
Attorney, Agent, or Firm—Hammond & Littell

[57] ABSTRACT

A process for the use of ω-Aminocarboxylic acid amides of the formula

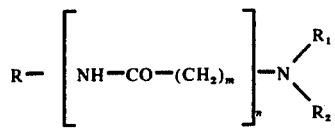

wherein R is an aliphatic hydrocarbon residue having 10 to 14 carbon atoms, $R_1$ and $R_2$ are selected from the group consisting of hydrogen, methyl, —$CH_2$—$CH_2OH$, —$CH_2$—$CHOH$—$CH_3$ and —$CH_2$—$CHOH$—$CH_2OH$, and $m$ and $n$ are integers from 1 to 10, to prevent the growth of microorganisms including compositions of phosphonate sequestering agents and ω-aminocarboxylic acid amides for use in industrial water treatment.

4 Claims, No Drawings

ANTIMICROBIAL USE OF ω-AMINOCARBOXYLIC ACID AMIDES

This is a division of Ser. No. 515,839, filed Oct. 18, 1974, and now abandoned.

Alkylamines having alkyl groups of about 8 to 18 carbon atoms are well known in the literature as antimicrobial compounds. However, they possess detrimental dermatological and toxicological properties which prevent their practical use on a large scale. On the other hand, they are of great interest because of their accessibility and low price. Hence, attempts were not lacking to find simple derivatives which not only combine the good antimicrobial efficacy with good dermal tolerance and favorable toxicological properties, but can be also prepared economically.

An object of the present invention is the development of ω-aminocarboxylic acid amides which are the reaction products of aliphatic amines having a medium-long chain length with aminocarboxylic acids or their lactams, as well as their preparation, and their use as antimicrobial substances.

A further object of the present invention is the development of an ω-aminocarboxylic acid amide selected from the group consisting of compounds of the formula

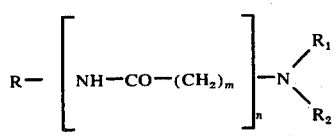

wherein R is an aliphatic hydrocarbon residue having from 10 to 14 carbon atoms selected from the group consisting of alkyl and alkenyl, $R_1$ and $R_2$ are members selected from the group consisting of hydrogen, methyl, $-CH_2-CH_2OH$, $-CH_2-CHOH-CH_3$ and $-CH_2-CHOH-CH_2OH$, and $m$ and $n$ are integers from 1 to 10 and their toxicologically-unobjectable acid addition salts.

Another object of the present invention is the development of a process for the production of the above ω-aminocarboxylic acid amides.

A yet further object of the invention is the development of a process for the prevention of growth and the destruction of microorganisms such as gram-positive bacteria, gramnegative bacteria, fungi and algae by contacting the microorganisms with the above ω-aminocarboxylic acid amides.

A still further object of the invention is the development of antimicrobial compositions comprising the above ω-aminocarboxylic acid amide and phosphonate sequestering agents.

These and other objects of the invention will become more apparent as the description thereof preceeds.

It has now been found that the above objects have been achieved by ω-aminocarboxylic acid amides having the general formula

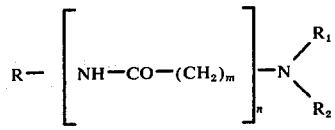

in which R designates a straight-chain or branched, saturated or unsaturated aliphatic hydrocarbon residue having 10 to 14 carbon atoms, $R_1$ and/or $R_2$ designate hydrogen, methyl, $-CH_2-CH_2OH$, $-CH_2-CHOH-CH_3$, or $-CH_2-CHOH-CH_2OH$, and $m$ and $n$ designate integers from 1 to 10.

More particularly, the invention relates to an ω-aminocarboxylic acid amide selected from the group consisting of compounds of the formula

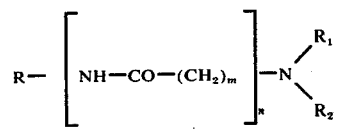

wherein R is an aliphatic hydrocarbon residue having from 10 to 14 carbon atoms selected from the group consisting of alkyl and alkenyl, $R_1$ and $R_2$ are members selected from the group consisting of hydrogen, methyl, $-CH_2-CH_2OH$, $-CH_2-CHOH-CH_3$ and $-CH_2-CHOH-CH_2OH$, and $m$ and $n$ are integers from 1 to 10 and their toxicologically-unobjectable acid addition salts.

The ω-aminocarboxylic acid amides can be prepared according to the methods of peptide chemistry known in the literature, as for example:

Method I

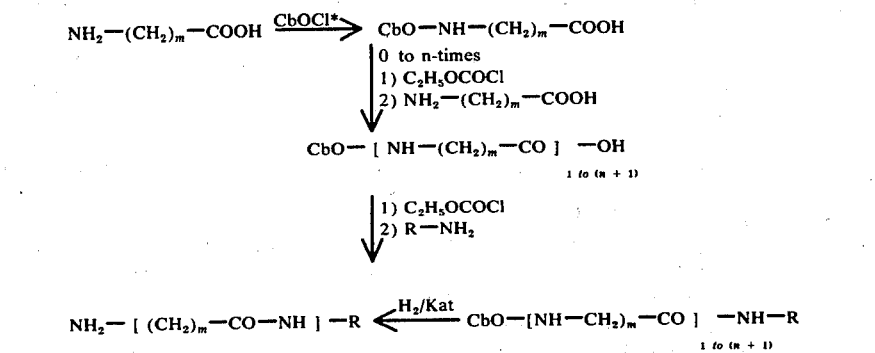

The compounds according to the invention can also be prepared starting with amines and lactones of ω-chlorocarboxylic acid chlorides.

Method II

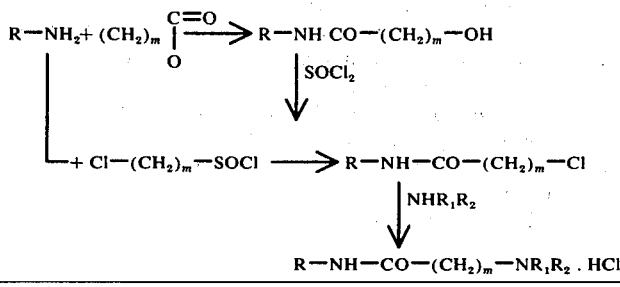

In the above methods, R, $R_1$, $R_2$, $n$ and $m$ have the above assigned values. The amine employed in the above reactions is an amine of the formula $$R - NH_2$$

wherein R has the above-assigned values. Among such amines are decylamine, undecylamine, dodecylamine, tetradecylamine, undecenylamine, isotridecylamine, dodecenylamine, the mixed amines derived from the naturally occurring fatty acids of the 10-to-14 carbon range, etc.

Special importance is to be attributed ω-aminocarboxylic acid amides having the general formula

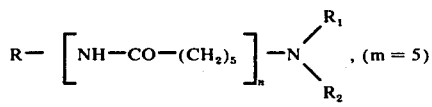

in which R, $R_1$, $R_2$ and $n$ have the above assigned meanings, since one can prepare these amides in a simple manner by heating the respective amines with ε-caprolactam.

To prepare the reaction products of the amines with ε-caprolactam, a melted mixture of ε-caprolactam and amine of respective amounts defined by the magnitude of $n$ are heated together at a temperature of 230° to 250° C under nitrogen for reaction times of 3 to 20 hours. Any unreacted amine is distilled off under vacuum. The reaction products are obtained as water-clear melts which upon cooling, solidify to form solid pulverizable masses. These powders can be directly used as an antimicrobial agent.

Equally good results are obtainable when the free ω-aminocarboxylic acids are replaced by their salts with toxicologically-unobjectionable inorganic acids or organic acids. Acids suitable for forming such salts are, for example, hydrochloric acid, sulfuric acid, phosphoric acid, formic acid, acetic acid, lactic acid, tartaric acid, citric acid, tetrachlorophthalic acid, tetrabromophthalic acid, etc. Where the products to the invention are prepared by the reaction of respective amines with ε-caprolactam, the calculated quantity of the above-named acids or other suitable acids is stirred into the melt of the reaction products, the melt is allowed to solidify and then pulverized; or the desired quantity of water is immediately stirred into the melt together with the acids and, thus, the aqueous solution of the resulting salt is obtained directly.

When the terminal-free amino group of the compounds which have been prepared as described above and have the general formula $$R - [NH - CO - (CH_2)_m]_n - NH_2$$

is caused to react with methylating reagents, ethylene oxide, propylene oxide and/or glycidol, then, the products which are obtained are comprised in the general formula in which $R_1$ and $R_2$ have the additional designations mentioned above. This variation in the composition of the products makes it possible to strongly influence some properties, such as melting point, solubility, dispersibility, without causing an essential change in the antimicrobial efficacy. The above-named reaction products of ε-caprolactam with the respective amines are caused to react with ethylene oxide, propylene oxide, or glycidol in a manner known per se in a mol ratio of 1:1.1 to 2.2 where elevated temperatures of 50° C to 150° C are used. For the economical preparation of the substances according to the invention, it has proven to be advantageous to effect the addition reaction immediately following the preparation of the reaction products of ε-caprolactam with the amines without carrying out an intermediate purification. As to the amines which serve as starting materials for the preparation of the ω-aminocarboxylic acid amides according to the invention, especially for the preparation of the reaction products with ε-caprolactam, these amines are products known in the literature. Examples of such amines are those discussed above, such as decylamine, undecylamine, undecylenylamine, dodecylamine, tridecylamine, tetradecylamine, as well as mixtures which have been prepared from acid mixtures of corresponding chain length, such as occur in natural oils.

The ω-aminocarboxylic acid amides uses as such as well as in the form of their salts show very good microbiostatic and microbiocidal activity with respect to gram-positive and gram-negative bacteria, and fungi as well as a good inhibitory effect upon algae. Because of their good dermatological tolerance and low toxicity, these compounds are excellently suitable for solving various technical problems of disinfection and preservation. Examples of such potential applications are, for example, the use as disinfectants in household cleaners, in industrial cleaners for foodstuff factories, dairies, breweries, in disinfectants for hospital areas; the use for disinfection in customary laundry processes and in dry-cleaning; the use as a preservative for cosmetics and adhesives based on cellulose, starch and animal protein; the use as preservative for dispersion dyestuffs and metal-working oils; and in the treatment of process water for many different purposes, such as, for example, in coolant circuits, swimming pools, scrubbers for air conditioning installations; as well as the use as a deodorant in deodorant soaps.

For use as antimicrobial substances, the addition products according to the invention can be incorporated into liquid, pasty or solid preparations. For this application, quantities of these products amounting to 0.1% to 5% by weight, preferably 0.5% to 3% by weight, based on the total weight are used. For application in the preservation or treatment of process water, a quantity is used such that 0.5 to 50 mgm, preferably 1 to 10 mgm, of an ω-aminocarboxylic acid amide according to the invention is charged per liter of the industrial or process water to be treated. When the substances according to the invention are to be packaged for the various applications, they can be combined with other additives, such as surface-active agents, water softeners, rust preventatives, complex-forming compounds, thickeners, bases, acids, perfumes, foam inhibitors, solvents, etc.

The addition products according to the invention for the preservation or treatment of industrial and process water are advantageously applied in combination with phosphonic acids or their water-soluble salts serving as complex-forming or sequestering agents.

Preferred are especially phosphonic acids which form complexes with divalent metals having the following formulae:

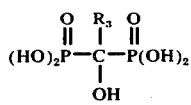
(I)

in which $R_3$ is phenyl or alkyl having 1 to 5 carbon atoms;

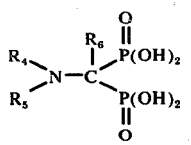
(II)

in which $R_4$ and $R_5$ each are hydrogen or an alkyl having 1 to 4 carbon atoms, and $R_6$ is hydrogen or an alkyl with 1 to 4 carbon atoms or phenyl;

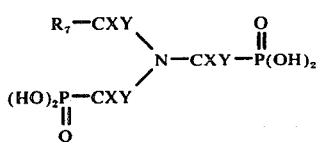
(III)

in which X and Y each are hydrogen or an alkyl having 1 to 4 carbon atoms and $R_7$ is a

group or a group having the formula:

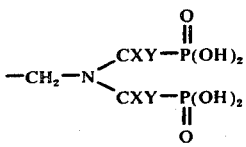

or

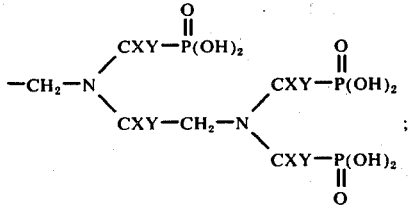

and

(IV)

in which $R_8$ is hydrogen, methyl or a —CH$_2$—CH$_2$—COOH.

Suitable phosphonic acids are, for example:
1-hydroxyethane-1,1-diphosphonic acid
1-hydroxypropane-1,1-diphosphonic acid
1-hydroxybutane-1,1diphosphonic acid
1-hydroxypentane-1,1-diphosphonic acid
1-hydroxyhexane-1,1-diphosphonic acid
1-hydroxy-1-phenylmethane-1,1-diphosphonic acid
1-aminoethane-1,1-diphosphonic acid
1-amino-phenylmethane-1,1-diphosphonic acid
dimethylaminoethane-1,1-diphosphonic acid
1-(dimethylamino)butane-1,1-diphosphonic acid
diethylaminomethane-1,1-diphosphonic acid
propylaminomethane-1,1-diphosphonic acid
butylaminomethane-1,1-diphosphonic acid
aminotrimethylenephosphonic acid
ethylenediaminetetramethylenephosphonic acid
diethylenetriaminepentamethylenephosphonic acid
amino-(2-propylene-2-phosphonic acid)
phosphonosuccinic acid
1-phosphono-1-methyl-succinic acid, and
2-phosphonobutane-1,2,4-tricarboxylic acid.

The water-soluble salts of the above-named phosphonic acids are especially the alkali metal salts, the ammonium salts, the lower alkylammonium salts and the lower alkylolammonium salts, such as sodium, potassium, ammonium or alkanolamine salts. One can either use the individual phosphonic acids or their mixtures. Especially advantageous is a mixture of 1-hydroxyethane-1,1-diphosphonic acid and aminotrimethylenephosphonic acid in a weight ratio of 4:1 to 1:4.

The packaged preservatives for industrial and process water contain such amounts of the phosphonic acids or their water-soluble salts that per liter of the water to be treated, these quantities amount to from 0.2 mgm to 1½ times the quantity which is required to totally complex the hardness forming ions in the system. The weight ratio of the phosphonic acid component to the biocide component can vary between 1:10 to 10:1. Preferably, a weight ratio of 3:1 to 1:3 is used. The water treated with the substances according to the invention should have a biocide content of between 0.5 and 50 gm per cubic meter and a content of phosphonic acid of between 0.2 and 20 gm per cubic meter.

When the addition products according to the invention are used for water treatment, they can also be combined with corrosion-preventing agents (inhibitors). Water-soluble orthophosphates, such as mono, di or trialkali metal phosphates are suitable for this purpose. Furthermore, watersoluble zinc salts, such as zinc sulfate as well as zinc nitrate, can be added instead of the orthophosphates. However, it is preferable to use the water-soluble zinc salts together with the orthophosphates. Other inhibitors which can be used, if so desired, are alkali metal nitrates, such as potassium nitrite or especially sodium nitrite. An addition of alkali metal silicates, such as potassium silicate or sodium silicate, can likewise be used as an inhibitor. The quantities of inhibitors added are 0.5 to 200 mgm per liter, preferably 1 to 50 mgm/liter. The individual admixed materials can be worked up to form solid mixtures. However, solutions can also be prepared from these mixtures by the addition of the quantities desired in each case to the water. There is no difficulty in adjusting these products either by the addition of an alkali metal hydroxide or carbonate or by the choice of a suitable mono, di or triorthophosphate so that at the same time, a certain pH regulation of the treated water is accomplished, in case this is desired or required.

The combination of the addition products according to the invention with the phosphonic acid components has various advantages. Among them is an increased synergistic attack of the biocide directed against the biological material. This results in very fast degradation of the proliferated organisms. Conversely, the biocide favors the dispersive effect of the phosphonic acid component as well as the corrosion-preventing effect. The very low dosages of the phosphonic acid component as well as of the biocide component result in minimal load on the sewage mains. Through the adsorptive binding of the biocide component to the biological material, a further reduction of the harmful material in the sewage mains occurs. In addition, the biocide component is biodegradable when diluted correspondingly.

The following examples explain the invention in more detail without limiting the scope of the invention in any respect.

EXAMPLES

For the tests of antimicrobial and algicidal efficacy, a series of products according to the invention were prepared by the following process:

EXAMPLE 1

Product A: $C_{12}H_{25}$-NH-CO-$CH_2$-$NH_2$ . HCl, N-glycyl-dodecylamine hydrochloride This compound was prepared according to the process which was designated above as Method II. In an autoclave, 6.5 gm (0.025 mol) of N-dodecyl-chloroacetamide were caused to react with 100 gm of liquid ammonia at room temperature for five days. The colorless powder that remainded after the excess ammonia has been distilled off, was boiled with ether and crystallized from ethanol. 3.1 gm of a colorless powder having a melting point of 98° C to 112° C was obtained. The yield amounted to 45% of the theory.

EXAMPLES 2 AND 3

The following additional compounds were prepared according to the process of Method II as described above.

Product B: $C_{10}H_{21}$—NH—CO—$(CH_2)_2$—$NH_2$ . HCl, 3-aminopropionic acid-decylamide Colorless powder, melting point = 145° C to 150° C.

Product C: $C_{12}H_{25}$—NH—CO—$(CH_2)_5$—$N(CH_3)_2$, 6-(N,N-dimethylamino)capronic acid-dodecylamide Colorless powder, melting point 48° C to 50° C.

EXAMPLE 4

Product D: $C_{12}H_{25}$—NH—CO—$(CH_2)_5$—$NH_2$, 6-aminocapronic acid-dodecylamide This compound was prepared according to the process designated above as Method I. 25 gm of benzyloxycarbonylaminocapronic acid-dodecylamide in 300 ml of methanol were hydrogenated in the presence of 5 gm of a 5% Pd/C catalyst at a temperature of 50° C and a hydrogen pressure of 55 atm. gauge for a period of 12 hours. After the catalyst had been filtered off, the solution was concentrated under vacuum, and the residue was twice crystallized from benzene. 8.3 gm of a colorless powder having a melting point of 70° C to 85° C was obtained. The yield amounts to 48% of the theory.

EXAMPLES 5 AND 6

The following additional compounds were prepared according to the process of Method I as described above:

Product E: $C_{12}H_{25}$ — [NH—CO—$(CH_2)_5$] $_2$ — $NH_2$

Colorless powder, melting point = 138° C to 140° C. An intermediate product produced during the preparation, $C_6H_5$—$CH_2$—OCO—NH— [$(CH_2)_5$—CO—NH] $_2$ —$C_{12}H_{25}$, had a melting point of 146° C to 151° C.

Product F: $C_{14}H_{29}$—NH—CO—$(CH_2)_5$—$NH_2$

Colorless powder, m.p. = 95° C to 120° C. An intermediate product produced during the preparation, $C_6H_5$—$CH_2$—OCO—NH—$(CH_2)_5$—CO—NH—$C_{14}H_{29}$, had a melting point of 107° C to 110° C.

EXAMPLES 7 TO 15

The products of the general formula

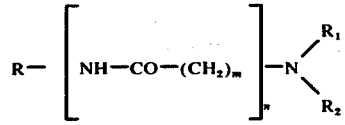

wherein m is 5, are of special interest since they can be prepared economically. For the preparation of these products, 1 mol of the respective amine and n mols of caprolactam were heated under a nitrogen atmosphere to 230° to 250° C for 20 hours while stirring vigorously. Subsequently, the unconverted amine was distilled off under vacuum. The compounds which were thus prepared and are listed in the following Table I are colorless to light-beige solids melting over a wide range. In the formulae, the indices outside the brackets (n) indicate the mols of caprolactam used per mol of amine. However, in the case of the reaction products which are mixtures of oligomers, these indices can assume the values 1 to 10.

TABLE I

| Product | $N_{tur.}$ | Melting Point ° C |
|---|---|---|
| G $C_{10}H_{21}$—NH—CO—$(CH_2)_5$—$NH_2$ | 4.18 | 60 to 75 |
| H $C_{10}H_{21}$— [ NH—CO—$(CH_2)_5$ ] $_2$—$NH_2$ | 3.40 | 75 to 125 |
| I $C_{10}H_{21}$— [ NH—CO—$(CH_2)_5$ ] $_3$—$NH_2$ | 2.93 | 110 to 125 |
| J $C_{12}H_{25}$—NH—CO—$(CH_2)_5$—$NH_2$ | 4.17 | 60 to 80 |

TABLE I-continued

| Product | $N_{titr.}$ | Melting Point °C |
|---|---|---|
| K $C_{12}H_{25}$—[NH—CO—$(CH_2)_5$]$_2$—$NH_2$ | 3.30 | 75 to 85 |
| L $C_{12}H_{25}$—[NH—CO—$(CH_2)_5$]$_3$—$NH_2$ | 2.67 | 80 to 110 |
| M $C_{14}H_{25}$—NH—CO—$(CH_2)_5$—$NH_2$ | 3.39 | 75 to 90 |
| N $C_{14}H_{24}$—[NH—CO—$(CH_2)_5$]$_2$—$NH_2$ | 3.16 | 80 to 130 |
| O $C_{14}H_{25}$—[NH—CO—$(CH_2)_5$]$_3$—$NH_2$ | 2.55 | 140 to 170 |

EXAMPLES 16 TO 19

For the preparation of products in which the residues $R_1$ and/or $R_2$ of the above general formula can designate —$CH_2$—CH(OH)—$CH_2OH$, the reaction products of dodecylamine with ε-caprolactam were caused to react with glycidol. For this purpose, 1 mol of a reaction product of ε-caprolactam and dodecylamine (the average molecular weight of which was calculated from $N_{titr.}$) was melted. "p" mols of glycidol were added to this melt at 80° to 140° C and the mixture was stirred for an additional two hours. Further details as to the reaction products thus prepared can be found in the following Table II.

TABLE II

| Product | Starting Product | p | $N_{titr.}$ | Appearance Of the Product |
|---|---|---|---|---|
| P | J | 1.1 | 3.21 | Bright, tacky wax |
| Q | J | 2.2 | 2.76 | Yellow, tenacious mass |
| R | K | 1.1 | 2.68 | Colorless, solid mass |
| S | K | 2.2 | 2.39 | Yellow, tenacious mass |

EXAMPLE 20

In order to measure the antimicrobial efficacy of the above-named ω-aminocarboxylic acid amides, their inhibitory effect upon the subsequently listed bacteria and fungi, as well as upon the germs in contaminated process water was determined.

| | | |
|---|---|---|
| 1) | Staphylococcus aureus | 5 × $10^7$ organisms/ml |
| 2) | Escherichia coli | 4 × $10^7$ organisms/ml |
| 3) | Pseudomonas aeruginosa | 4 × $10^7$ organism/ml |
| 4) | Candida albicans | 2 × $10^6$ organisms/ml |
| 5) | Aspergillus niger | 9 × $10^5$ organisms/ml |
| 6) | Mixture of contaminated water from 3 cooling towers | |
| 7) | Mixture of contaminated water from 3 scrubbers of air conditioning installations | |

The minimum inhibitory concentrations of the products to be tested were determined by means of the dilution test according to the standards for the examination of chemical disinfectants which had been published in 1959 by the Deutsche Gesellschaft fur Hygiene und Mikrobiologie (German Association for Hygiene and Microbiology). The tests were carried out in test tubes which were filled with Standard-I-Broth (Merck) or with beer wort (8° Be) and diluted 1:5 with tap water. After the addition of the active substances, the volume of the nutrient solution in the test tubes was adjusted to 10 ml. Next, the test tubes were inoculated with 0.1 ml test organism suspension. In the case of bacteria, the inoculated test tubes were incubated in the incubator for 3 days at 37° C and in the case of fungi, they incubated for 6 days at 30° C. Subsequently, the concentration of the compound added to the nutrient medium which was just able to inhibit completely the growth of the germs was determined. The value thus determined was designated as the minimum inhibitory concentration (m.i.c.). The following concentration intervals were used for the tests: 1,000 ppm, 750 ppm, 500 ppm, 250 ppm, 100 ppm, 50 ppm, 25 ppm, 10 ppm, 7.5 ppm, 5ppm, 2.5 ppm, and 1 ppm.

The inhibitory concentrations of the individual products for the above-quoted germs which were determined in this dilution test are listed in the following Table III.

TABLE III

Minimum Inhibitory Concentrations of the Products A to S in ppm

| Substance | Used Test Germ or Test Product | | | | | | |
|---|---|---|---|---|---|---|---|
| | 1 | 2 | 3 | 4 | 5 | 6 | 7 |
| A | 50 | 100 | 500 | 50 | 100 | 25 | 25 |
| B | 50 | 50 | 100 | 100 | 100 | 25 | 25 |
| C | 25 | 25 | 1000 | 100 | 250 | 10 | 10 |
| D | 5 | 5 | 100 | 50 | 50 | 5 | 5 |
| E | 50 | 50 | 250 | 250 | 250 | 25 | 25 |
| F | 5 | 5 | 250 | 50 | 100 | 7.5 | 7.5 |
| G | 50 | 50 | 250 | 100 | 100 | 25 | 25 |
| H | 50 | 50 | 100 | 100 | 250 | 25 | 25 |
| I | 100 | 100 | 250 | 250 | 250 | 50 | 50 |
| J | 10 | 10 | 50 | 50 | 50 | 7.5 | 7.5 |
| K | 10 | 10 | 100 | 10 | 50 | 10 | 10 |
| L | 25 | 25 | 250 | 50 | 100 | 10 | 10 |
| M | 10 | 10 | 1000 | 50 | 100 | 10 | 10 |
| N | 10 | 10 | 500 | 50 | 50 | 7.5 | 7.5 |
| O | 50 | 10 | 1000 | 50 | 100 | 25 | 25 |
| P | 10 | 10 | 250 | 50 | 50 | 10 | 10 |
| Q | 50 | 50 | 1000 | 50 | 100 | 25 | 25 |
| R | 50 | 50 | 500 | 100 | 50 | 25 | 25 |
| S | 50 | 100 | 1000 | 50 | 50 | 25 | 25 |

Table III convincingly shows the strong inhibitory effect exerted on the bacteria and fungi by the products according to the invention.

EXAMPLE 21

The microbicidal effect of some products named above was determined by means of the suspension test. The methodology of this testing procedure has been taken from the standards for the testing of chemical disinfectants, published in 1959 by the German Association for Hygiene and Microbiology. In conformity with these standards, 0.1 ml of a test organism suspension of the following enumerated bacteria or fungi was pipetted into test tubes at 18° C to 21° C.

| | | |
|---|---|---|
| 1) | Staphylococcus aureus | 5 × $10^7$ organisms/ml |
| 2) | Escherichia coli | 4 × $10^7$ organisms/ml |
| 3) | Pseudomonas aeruginosa | 4 × $10^7$ organisms/ml |

The products of the invention to be tested were dissolved in tap water of 16° dH (German degrees of hardness). Then, 10 ml of the respective dilution quantity of the product to be tested were added to each test tube. The concentrations of the products according to the invention were 100 ppm, 250 ppm and 500 ppm in each case. After a duration of action amounting to 1, 2.5, 5, 10, 20, 30 and 60 minutes, a loop of material was taken from each test tube and inoculated in 10 ml of nutrient solution which contained 3% Tween and 0.3% Lecithin as de-inhibitors. The nutrient solutions inoculated with bacteria were incubated at 37° C whereas the nutrient solutions inoculated with fungi were incubated at 30° C. After 6 days, the growth of the cultures was macroscopically evaluated. Thus, the destruction periods or sterilization times were determined and are summarized in the following Table IV.

TABLE IV

Time Periods in which the Products According to the Invention Destroyed the Various Test Organism Suspensions in Minutes

| Substance | Germ | Concentration of the Products in Tap Water | | |
|---|---|---|---|---|
| | | 100 ppm | 250 ppm | 500 ppm |
| | | Sterilization Time in Minutes | | |
| A | 1 | 10 | 5 | 5 |
| | 2 | 20 | 10 | 10 |
| | 3 | 60 | 20 | 10 |
| B | 1 | 5 | 5 | 5 |
| | 2 | 10 | 10 | 10 |
| | 3 | 30 | 10 | 10 |
| C | 1 | 5 | 2.5 | 2.5 |
| | 2 | 10 | 5 | 5 |
| | 3 | 30 | 10 | 5 |
| J | 1 | 5 | 2.5 | 2.5 |
| | 2 | 10 | 5 | 2.5 |
| | 3 | 40 | 10 | 2.5 |
| K | 1 | 5 | 2.5 | 1 |
| | 2 | 60 | 30 | 10 |
| | 3 | 60 | 60 | 30 |
| P | 1 | 2.5 | 2.5 | 2.5 |
| | 2 | 5 | 2.5 | 2.5 |
| | 3 | 10 | 5 | 5 |
| Q | 1 | 5 | 5 | 5 |
| | 2 | 10 | 10 | 10 |
| | 3 | 40 | 10 | 10 |

The above Table IV clearly shows the very good efficacy of the products of the invention in destroying both gram-positive and gram-negative bacteria.

EXAMPLE 22

The efficacy in inhibiting growth of algae was determined in cylindrical vessels under intensive aeration. Into the vessels, there were introduced 100 ml of a nutrient solution to which increasing quantities of active substances had been added as well as 4 ml of a mixed suspension of Scenedesmus obliquus and Chlorella vulgaris.

The nutrition solution has the following composition:

| | Grams |
|---|---|
| Ammonium chloride | 0.1 |
| Sodium nitrate | 1.0 |
| Dipotassium hydrogen phosphate | 0.25 |
| Magnesium sulfate, cryst. | 0.5 |
| Calcium chloride | 0.1 |
| Iron-(III) chloride | 0.003 |

These compounds were dissolved in 1000 ml of distilled water. The pH value of the nutrient solution was 7.2. The tests were carried out with the following concentration intervals of the active substance: 10 ppm, 5 ppm, 2.5 ppm, 2 ppm, 1.5 ppm, 1 ppm, 0.75 ppm, 0.5 ppm, and 0.25 ppm. The minimum inhibitory concentration determined after 7 days are summarized in the following Table V.

TABLE V

Inhibition of the Growth of Algae

| Substance | Minimum Inhibitory Concentration in ppm |
|---|---|
| B | 1 |
| C | 0.75 |
| J | 1.5 |
| K | 1 |
| P | 1 |
| Q | 2.5 |

As the above Table V shows, the products according to the invention also have an excellent inhibitory effect on algae.

EXAMPLE 23

Inhibition of the Growth of Sulfate-Reducing Bacteria

The minimum inhibitory concentrations were determined in 50 ml screw-top bottles. The bottles were charged with an optimum nutrient solution for the growth of sulfate-reducing bacteria of the following composition:

| | Grams |
|---|---|
| Sodium lactate | 4.0 |
| Yeast extract | 1.0 |
| Ascorbic acid | 0.1 |
| Magnesium sulfate cryst. | 0.5 |
| Dipotassium hydrogen phosphate | 0.2 |
| Ammonium ferric alum | 0.1 |
| Sodium chloride | 2.0 | which compounds were dissolved in 1000 ml of distilled water. The pH value of the nutrient solution was 7.4.

After various concentrations of the products to be tested had been added, 1 ml of a pure culture of Desulfovibrio desulfuricans $6 \times 10^5$ organisms/ml was used for inoculation, followed by incubation at 37° C for 4 weeks. The following concentration intervals were used for the tests: 100 ppm, 50 ppm, 40 ppm, 30 ppm, 20 ppm, 10 ppm, 5 ppm, 2.5 ppm, and 1 ppm.

In this test, the minimum inhibitory concentrations listed in the following Table VI were determined for the individual products.

TABLE VI

Inhibition of the Growth of Desulfovibrio Desulfuricans

| Substance | Inhibitory Concentration in ppm |
|---|---|
| B | 5 |
| C | 2.5 |
| J | 5 |
| K | 5 |
| P | 10 |
| Q | 20 |

This experiment also reflects the excellent efficacy of the substances according to the invention.

EXAMPLE 24

The coolant circuit of a steam power station having a volume of 6,000 m³ and an hourly feed supply of 150 m³ as well as a turnover circulation of 11,000 m³/h at about a 3-fold concentration was treated for 6 months with a mixture of 1-hydroxyethane-1,1-diphosphonic acid and aminotrimethylenephosphonic acid (in a ratio by weight of 1:1. The quantity of addition amounted to 4 mg/m³. Although good effects as to protection against corrosion and boiler scale were observed, disturbances occurred again and again caused by the growth on the condenser with slime-forming bacteria.

Consequently, an additional dosage of 5 mg/m³ of the following product was introduced. This product was obtained by the addition of 1 mol glycidol to a product prepared by the reaction of dodecylamine with ε-caprolactam in a molar ratio of 1:1 (Product P). When this product according to the invention and phosphonic acids were added, the difficulties in the coolant circuit were completely removed by this combined addition. The degree of hardness of the coolant water did not increase, the growth of microorganisms in the cooling water did not take place.

EXAMPLE 25

The Product J having very favorable microbistatic as well as microbicidal properties was selected to show the physiological tolerance of the products according to the invention. For this purpose, the following details of the tests conducted are reported:

1. The lethal dose ($LD_{50}$) was determined.
2. The dermal tolerance of the hairless mouse was determined by treatment with 1% aqueous preparations administered topically to each mouse twice on five consecutive days (10 animals).
3. The mucocutaneous tolerance of the eye of the rabbit was determined by treatment with 1% aqueous preparations.

These tests have the following results:
1. $LD_{50}$ = 3.30 gm/mg in the mouse.
2. No findings for any animal.
3. Slight conjunctival reaction which after 48 hours totally subsided; no irritation of cornea and iris.

Some further examples as to potential applications of the products according to the invention are given below.

EXAMPLE 26

Prewashing Agent with Simultaneous Antimicrobial Action

A prewashing agent having antimicrobial activity was prepared from the following recipe by known processures.

|  | Parts by Weight |
| --- | --- |
| olefinsulfonate (the sodium salt) | 8.0 |
| Soap | 4.0 |
| Foam inhibitor | 0.3 |
| $Na_4P_2O_7$ | 36.0 |
| NaOH | 7.5 |
| $Na_2SO_4$ | 10.2 |
| Product J | 4.0 |

EXAMPLE 27

Antimicrobial Detergent for Laundries

An antimicrobial detergent for laundries was prepared from the following recipe by known procedures.

|  | Parts by Weight |
| --- | --- |
| Fatty alcohol sulfate | 25.0 |
| $Na_5P_3O_{10}$ | 35.0 |
| $Na_2CO_3$ | 7.0 |
| $Na_2SO_4$ | 15.0 |
| $Na_2O \cdot 3.3\ SiO_2$ | 5.0 |
| Carboxymethyl cellulose | 1.0 |
| Product P | 2.0 |
| Pentasodium aminotrimethylene-phosphonate | 10.0 |

EXAMPLE 28

Antimicrobial Acidic Detergent for the Beverage Industry

An antimicrobial acidic detergent for the beverage industry was prepared from the following recipe by known procedures.

|  | Parts by Weight |
| --- | --- |
| Phosphoric acid (80)% | 50.0 |
| Nonylphenol + 9 mols ethylene oxide | 4.0 |
| 1-Hydroxyethane-1,1-diphosphonic acid | 5.0 |
| Product B | 1.0 |
| Water | 40.0 |

EXAMPLE 29

Antimicrobial Light Duty Detergent

An antimicrobial light duty detergent was prepared from the following recipe by known procedures.

|  | Parts by Weight |
| --- | --- |
| Dodecylbenzenesulfonate (sodium salt) | 30.0 |
| Toluenesulfonate (sodium salt) | 2.0 |
| Sodium cocofatty alcohol sulfate | 8.0 |
| Sodium sulfate | 30.0 |
| Sodium carboxymethyl cellulose | 1.0 |
| Product Q | 4.0 |
| Water | 25.0 |

The products according to the invention can be also used as antimicrobial substances in dry-cleaning mixtures based on organic solvents having a small content of water. For the addition to the cleaning mixtures of the substances A to S, a concentration of 1 to 10 gm/liter are used. Customarily, the activators for the cleaning solvents based on anionic or non-ionic surfactants are added in the form of concentrates which, in addition to the surfactants, contain solvents such as chlorinated hydrocarbons or mineral oil and, if necessary, dissolving intermediates, such as for example, isopropanol and water. The addition products of the invention can be incorporated into these concentrates and proportioned together with the activator for the cleaning action. In drycleaning, so much water is added to the cleaning mixtures that during the cleaning process, the relative humidity in the steam space over the mixture amounts to at least 70%.

The products of the invention can be not only used in detergents to obtain antimicrobial efficacy of the products, but can be also utilized as preservatives of cosmetics, starch pastes, glues, dispersion dyestuffs, cutting and boring oils and the like.

For this purpose, an addition of 0.1% to 2% by weight, based on the product to be preserved, is generally sufficient.

EXAMPLE 30

An important field of application for the products according to the invention is the conservation of industrial and process water. An additive suitable for this purpose has the following composition:

| | Parts by Weight |
|---|---|
| Product P | 100.0 |
| Sodium salt of the aminotri-methylenetriphosphonic acid | 15.0 |
| Sodium salt of the aminotrimethylene-triphosphonic acid | 15.0 |
| De-ionized water to | 1000 |

100 cm$^3$ of this solution is employed per m$^3$ of the industrial water to be preserved, as for instance, the cooling water for cooling towers.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. A process for combatting microorganisms selected from the group consisting of gram-positive bacteria, gramnegative bacteria, fungi and algae which consists in contacting said microorganisms with a toxic amount of a ω-aminocarboxylic acid amide of the formula

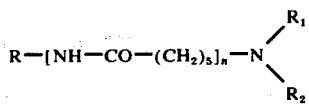

wherein R is an aliphatic hydrocarbon residue having from 10 to 14 carbon atoms selected from the group consisting of alkyl and alkenyl, $R_1$ and $R_2$ are members selected from the group consisting of hydrogen, methyl, —CH$_2$—CH$_2$OH, —CH$_2$—CHOH—CH$_3$ and —CH$_2$—CHOH—CH$_2$OH, and $n$ is an integer from 1 to 10, and their toxicologically-unobjectable acid addition salts.

2. The process of claim 1 wherein said microorganisms are algae.

3. The process of claim 1 wherein said microorganisms are in aqueous suspension and said ω-aminocarboxylic acid amide is employed in an amount of from 0.5 mgm to 50 mgm per liter of said aqueous suspension.

4. The process of claim 3 wherein said aqueous suspension is industrial process water.

* * * * *